(12) United States Patent
Gebele et al.

(10) Patent No.: US 6,858,861 B2
(45) Date of Patent: Feb. 22, 2005

(54) APPARATUS AND METHOD FOR SCANNING INFORMATION STORED IN A MEMORY PHOSPHOR

(75) Inventors: Herbert Gebele, Sauerlach (DE); Jurgen Muller, Munich (DE); Robert Fasbender, Ottobrunn (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 275 days.

(21) Appl. No.: 10/308,276

(22) Filed: Dec. 3, 2002

(65) Prior Publication Data

US 2003/0111620 A1 Jun. 19, 2003

(30) Foreign Application Priority Data

Dec. 17, 2001 (EP) .............................................. 01129929

(51) Int. Cl.[7] .............................................. G03B 42/08
(52) U.S. Cl. ....................................................... 250/586
(58) Field of Search ......................................... 250/586

(56) References Cited

U.S. PATENT DOCUMENTS 4,851,678 A    7/1989  Adachi et al. ........... 250/327.2
6,479,829 B1 * 11/2002  Katagiri ................... 250/484.5

FOREIGN PATENT DOCUMENTS

| EP | 1 130 417 A1 | 2/2000 | ............. G01T/1/29 |
| WO | 99/28765 | 6/1999 | ............. G01T/1/29 |

* cited by examiner

Primary Examiner—David Porta
Assistant Examiner—Marcus Taningco
(74) Attorney, Agent, or Firm—Darby & Darby

(57) ABSTRACT

An apparatus for reading information stored in a memory phosphor has a detecting device with an array of radiation-sensitive surface segments which during a pre-settable integration time interval receive a secondary radiation emitted by the memory phosphor. The apparatus includes a controller device that sets the integration time interval dependent on an amount of secondary radiation that was received at a preceding time. The controller device can also connect the radiation-sensitive surface segments into groups whose size depends on the amount of secondary radiation that was received at a preceding time.

38 Claims, 6 Drawing Sheets

APPARATUS AND METHOD FOR SCANNING INFORMATION STORED IN A MEMORY PHOSPHOR

BACKGROUND OF THE INVENTION

The present invention relates to an apparatus and method for scanning (also referred to as reading) information that is stored in a memory-retaining luminescent material (hereinafter referred to as a memory phosphor).

In particular in medical applications, an image of an object, for example a patient, is produced by means of x-rays and stored as a latent image in a memory phosphor. The latent x-ray image is retrieved by stimulating the memory phosphor by means of a radiation source. In response to the stimulant radiation, the memory phosphor will emit light of an intensity that is proportional to the amount of x-ray radiation stored in the memory phosphor. The light emitted by the memory phosphor (hereinafter referred to as emitted radiation or secondary radiation) is received by a detecting device and converted into electrical signals, so that the x-ray image stored in the memory phosphor can subsequently be made visible. The x-ray image can be displayed, for example, directly on a monitor, or it can be transferred photographically to a radiographic film.

The memory phosphor provides a large dynamic range for the intermediate storage of x-ray information. However, the extent to which this dynamic range can be used may be limited depending on the kind of detecting device that is employed for the retrieval of the x-ray information from the memory phosphor. This limitation becomes apparent in particular when examining objects that differ widely in the dose of radiation required for the x-ray image.

A device for reading information stored in a memory phosphor is known for example from the patent application WO 99/28765. The device uses an arrangement where the memory phosphor is excited line-by-line by a stimulant radiation that is produced by a radiation source. The radiation source may be configured, e.g., as a line of laser diodes. The light emitted by the memory phosphor as a result of the stimulation is received by a detecting device. To perform its receiver function, the detecting device has a large number of radiation-sensitive surface segments that are arranged in a row next to each other. The radiation emitted by the memory phosphor is received by the radiation-sensitive surfaces. The detecting device can be a linear CCD (Charge-Coupled Device) array containing a large number of photo-detectors arranged in a row next to each other. To take the reading from the memory phosphor, the stimulant radiation source and the detecting device are moved at a uniform speed across the memory phosphor. In response to the amount of emitted radiation that each of the radiation-sensitive surface segments receives during an exposure period, the detecting device produces a corresponding number of electrons. Thus, the electrostatic charges produced for each of the pixels of a row represent a measure for the amount of radiation emitted by each individual pixel.

OBJECT OF THE INVENTION

The present invention has the objective to provide a high quality level in the retrieval of the broadest diversity of stored information from a memory phosphor, particularly with regard to a wide range of variation in the dosage levels.

SUMMARY OF THE INVENTION

According to the invention, an apparatus for reading information stored in a memory phosphor has a detecting device for detecting a secondary radiation emitted by the memory phosphor. The detecting device contains a plurality of radiation-sensitive surface segments to receive the secondary radiation during a pre-settable integration time interval. A controller device that is part of the apparatus selects the integration time interval dependent on a detected amount of secondary radiation received by at least one of the radiation-sensitive surface segments at a preceding time.

In an alternative embodiment of the inventive apparatus, the controller device connects the radiation-sensitive surface segments into groups of several surface segments dependent on a detected amount of secondary radiation received by at least one of the radiation-sensitive surface segments at a preceding time. In this arrangement, the detecting device generates a combined signal for the surface elements of each group, and the combined signal is indicative of the combined amount of secondary radiation received by the surface segments of a group.

As an advantageous possibility, the controller device could also be designed to use a combination of both of the foregoing concepts, i.e., to set the integration time interval as well as connect the radiation-sensitive surface segments into groups of several surface segments dependent on a detected amount of secondary radiation received by at least one of the radiation-sensitive surface segments at a preceding time.

Further according to the invention, a method of reading information stored in a memory phosphor has the following steps:
a) by means of a plurality of radiation-sensitive surface segments, a secondary radiation emitted by the memory phosphor is received during a currently effective integration time interval;
b) the amount of secondary radiation received by at least one of the radiation-sensitive surface segments during the currently effective integration time interval is evaluated by means of a controller device;
c) based on the evaluation, a decision is made to either maintain the currently effective integration time interval for a next cycle of the method or to set a new integration time interval for the next cycle of the method;
d) the process is continued by proceeding to the next cycle beginning with step a).

An alternative embodiment of the method makes use of the aforementioned concept of connecting the radiation-sensitive surface segments of the detecting device into groups. This version of the method has the following steps:
a) by means of the plurality of radiation-sensitive surface segments, the secondary radiation emitted by the memory phosphor is received during a set time interval;
b) the amount of secondary radiation received by at least one of the radiation-sensitive surface segments is evaluated by means of a controller device;
c) based on said evaluation, a decision is made to either maintain the currently effective grouping of surface segments for a next cycle of the method or to switch to a different grouping of surface segments for the next cycle of the method;
d) the process is continued by proceeding to the next cycle beginning with step a).

Devices or methods according to the invention can be used in particular in medical x-ray applications or in the non-destructive testing of materials. In accordance with the present invention, the time interval during which the radiation-sensitive surface segments of the detecting device receive emitted radiation (hereinafter referred to as integration time interval) can be selectively adjusted. As an alternative or in addition, the radiation-sensitive surface segments of the detecting device can be combined into groups, where each group contains two or more of the radiation-sensitive surface segments. In particular, the combination into groups is made electronically through an appropriate means of controlling the detecting device. The detecting device can be controlled by command signals that determine which and how many of the radiation-sensitive surface segments are to be combined. Combining the radiation-sensitive surface segments into groups has the effect that in the reading process, the emitted radiation received from the combined surface segments of a group is converted into a combined charge of electrons. Thus, a combined electrical signal is generated for the combined radiation-sensitive surface segments, and the combined signal is indicative of the combined amount of radiation received from the surface segments that are connected as a group. According to the invention, the setting of the integration time or the combining of surface segments into groups occurs as a quantitatively differentiated response to an amount of emitted radiation that was received by the detecting device.

The invention offers the advantageous possibility to adapt the dynamic range of the detecting device to the quantity of information stored in the memory phosphor. This provides the benefit of a more efficient utilization of the available dynamic range of the detecting device and of the memory phosphor. In particular, adjusting the integration time or combining the radiation-sensitive surface segments into groups has the result of setting an effective pixel area from which the emitted radiation is received. A short integration time and/or a non-connected state of the radiation-sensitive surface segments results in a small effective pixel area, while a long integration time or the connection of radiation-sensitive surface segments into groups results in a large effective pixel area.

With large effective pixel areas, i.e., by connecting the radiation-sensitive surface segments in groups, the result of the reading process will be less affected by noise, in particular by noise generated in the detecting device. As a result, the quality of the retrieved information is increased. The readings taken by the detecting device are accompanied by a specific kind of readout noise. With a CCD-based detecting device, the readout noise can be caused in particular by the amplifier of the CCD output stage. By using the inventive concept of combining the radiation of more than one of the radiation-sensitive surface segments, the yield of useful information generated by the combined radiation-sensitive surface segments increases in comparison to the noise as a ratio of the total signal. Especially if the amount of emitted radiation available for detection is small, it is advantageous to set a longer integration time or to form groups with several radiation-sensitive surface segments. If on the other hand a large quantity of information is stored in the memory phosphor, the amount of radiation emitted by the memory phosphor will likewise be large, and the useful information will therefore be a large portion of the signal in comparison to the noise, so that the noise, in particular of the detecting device, is of negligible importance. In this case, a short average time can be set, or the radiation-sensitive surface segments can be switched to the non-connected state. Furthermore, with a design of the controller device in accordance with the invention, it is possible to largely prevent the detecting device from operating above its capacity limit, so that the risk of losing information in the reading process can at least be reduced. The detecting device is prevented from reaching the saturation range when reading the information. It is nevertheless advantageous if the detecting device works near the saturation range in each individual reading process, because this enhances the separation between the usable signal and the noise. Furthermore, with the inventive concept of increasing the effective pixel area for the reading process from the memory phosphor the detail resolution of the information extracted by the reading process can be reduced in certain applications where this is permissible. This reduces the amount of memory capacity required for storing the data that carry the information produced by the reading process. As a result, it is possible to use cost-effective memory devices.

In an advantageous embodiment of the invention, the controller device contains a first threshold value corresponding to a specific first amount of secondary radiation. The first threshold value indicates how much secondary radiation must have been received in order to set a specific integration time or to connect a specific number of radiation-sensitive surface segments. Thus, the fact that the detecting device reaches or fails to reach the first threshold value when receiving secondary radiation provides the controller device with a criterion for setting the integration time or for connecting the radiation-sensitive surface segments. If the amount of received radiation fails to reach the first threshold value, the controller device sets a first integration time interval or connects a first number $N_1$ of radiation-sensitive surface segments. If the received amount of emitted radiation exceeds the first threshold value, it is advantageous to set a second integration time interval that is shorter than the first integration time interval or to connect a second number $N_2$ of radiation-sensitive surface segments that is smaller than $N_1$. This represents a simple way of setting an effective criterion for setting the integration time or for connecting a specific number of radiation-sensitive surface segments.

In a further, particularly favorable embodiment, a kind of hysteresis lag is used in changing the settings for the integration time interval and/or for changing the number of radiation-sensitive surface elements connected in a group. To realize this concept, the controller device contains a second threshold value corresponding to a specific second quantity of emitted radiation that is smaller than the first quantity of emitted radiation. This serves to prevent a condition where the integration time interval or the number of connected radiation-sensitive surface segments would constantly change back and forth if the amount of received radiation is in the immediate vicinity of the first threshold value. The first threshold value is preferably selected so that the detecting device is prevented from operating above the practical upper limit of its radiation-receiving capacity.

In a particularly advantageous embodiment of the invention, the controller device has the capabilities of setting the integration time as well as controlling the switches for connecting the radiation-sensitive surface segments.

There are different possibilities to determine the criteria as to when and in which way a specific integration time interval is to be set or a specific number of radiation-sensitive surface segments are to be connected. One possibility is to analyze the readings from one or more of the rows of the memory phosphor in regard to the amount of radiation emitted by the pixels in the one or more rows. For example, it is possible to select one or more specific pixels of the row(s) being tested, so that only the radiation emitted by the selected pixel(s) is used for setting the integration time interval or for connecting the radiation-sensitive surface segments into groups. By making use of this flexibility, the apparatus according to the invention can be optimally adjusted for different applications. Furthermore, an optimal balance can be achieved in each application between the quality level of the information extracted from the memory phosphor and the cost and effort expended, particularly in regard to processing the information in a computer.

In addition to analyzing the absolute amounts of radiation emitted by one or more pixels, a further advantageous embodiment of the invention provides the possibility of evaluating the relative difference between the amounts of radiation emitted by different pixels. Particularly valuable information for setting the integration time or connecting the radiation-sensitive surface segments is gained from using the difference between the amounts of secondary radiation emitted by two or more adjacent pixels in a row or of several rows. Based on the emitted radiation received by one pixel or by several pixels of the memory phosphor, either in the form of absolute amounts or differential amounts, one can thus make a more or less accurate prediction about the amount of emitted radiation to be anticipated from the pixels of the memory phosphor that still remain to be read.

According to a further advantageous embodiment of the invention, the radiation-sensitive surface segments of the detecting device have an elongated shape. In comparison to a compact shape where the width of a surface segment is equal to its length, the amount of emitted radiation received by the detecting device in the direction transverse to the row can be increased. This has the result of improving the signal-to-noise ratio in the process of receiving the information.

In a particularly advantageous embodiment, the step of detecting the radiation emitted by the memory phosphor occurs immediately after the information has been stored in the memory phosphor. Particularly in a case where the information is stored in the memory phosphor by means of x-rays, a spontaneous emission of secondary radiation occurs immediately after the storing, without the need for an excitation to stimulate the memory phosphor into releasing the emitted radiation. Thus, by performing the detection immediately, the radiation that is emitted spontaneously after the storing of the information is not lost. The reading taken from the spontaneously emitted radiation can be used by the controller device for the setting of the integration time or for the step of connecting the radiation-sensitive surface segments into groups. This allows a prediction to be made about the amount of emitted radiation that is to be anticipated in the reading of the information from the memory phosphor. This prediction can be used particularly for the setting of the controller device. The detection of the emitted radiation that is spontaneously released after the storing can be performed by automatically moving the detecting device over the memory phosphor immediately after the storing. If the apparatus according to the invention is connected to a radiation source that serves to store the information on the memory phosphor, the radiation source can send a signal to the reader apparatus according to the invention to indicate that the information has been stored. The signal can then be used directly to initiate the transport movement of the detecting device.

It is advantageous if prior to starting the reading of the memory phosphor, the controller device selects the short integration time interval (also referred to herein as the first time interval) and connects the smaller (second) number $N_2$ of radiation-sensitive surface segments. This preventive measure is taken already before the start of the reading process to ensure that the detecting device will not be at or above the practical limit of its detecting capability.

BRIEF DESCRIPTION OF THE DRAWINGS

Advantageous embodiments and features of the invention will be covered in the following detailed description based on examples that are illustrated in the attached drawings, wherein.

DETAILED DESCRIPTION OF PREFERRED EMBODIMENTS

In the following, identical elements or elements performing identical functions are identified by the same reference symbols.

Figure 1:
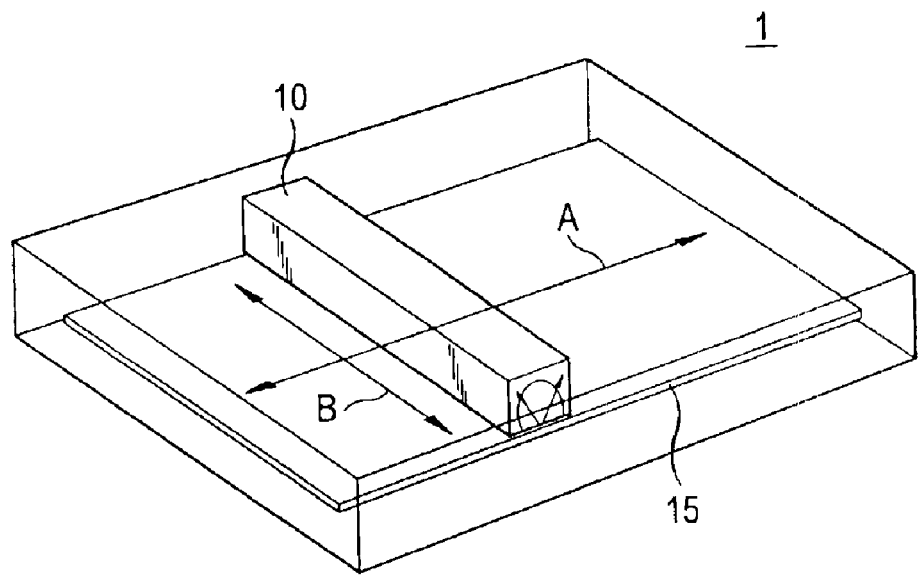
FIG. 1 schematically illustrates an example of a device according to the invention in the form of an x-ray cassette.

FIG. 1 gives a perspective view of an x-ray cassette 1 that is equipped with a reader device according to the present invention in the form of a reading head 10. The x-ray cassette 1 contains a memory phosphor 15 configured as a phosphor carrier plate holding a layer of memory phosphor of about 300 μm thickness. By exposure to x-rays, the memory phosphor can be put into a state of excitation, whereby an x-ray image of an object is recorded on the phosphor carrier plate 15. When the phosphor carrier plate 15 is exposed to a stimulant radiation, particularly in the range of red light, it will release a secondary radiation that lies in particular in the blue or ultraviolet range. The amount or intensity of the secondary radiation emitted by the phosphor carrier plate 15 in response to the stimulant radiation is a measure for the amount of x-ray radiation that was received in the initial x-ray exposure. Every point (pixel) of the phosphor carrier plate 15 that was stimulated to release the secondary radiation will emit the secondary radiation according to Lambert's law. The phosphor carrier plate 15 represents a Lambert radiator which emits radiation in all directions. The reading head 10 contains a radiation source for the stimulant radiation that is used to stimulate the phosphor carrier plate 15. The reading head 10 further contains a detecting device to receive the secondary radiation emitted by the phosphor carrier plate. The radiation source and the detecting device are held in fixed connection to each other in the reading head 10. The reading head 10 extends over the entire width of the phosphor carrier plate 15. The reading head 10 allows the information stored in an entire row of the phosphor carrier plate to be read in a parallel (simultaneous) mode. A row extends substantially over the entire width of the phosphor carrier plate 15. The orientation of the rows is indicated by the symbol B in FIG. 1. By means of a drive mechanism (not shown in FIG. 1), the reading head 10 moves in the transverse direction relative to the orientation of the row, i.e., in the lengthwise direction of the phosphor carrier plate 15 as indicated by the arrow with the symbol A. In other words, A indicates the direction in which the reading head 10 advances, which is transverse to the direction of the rows.

Figure 2:
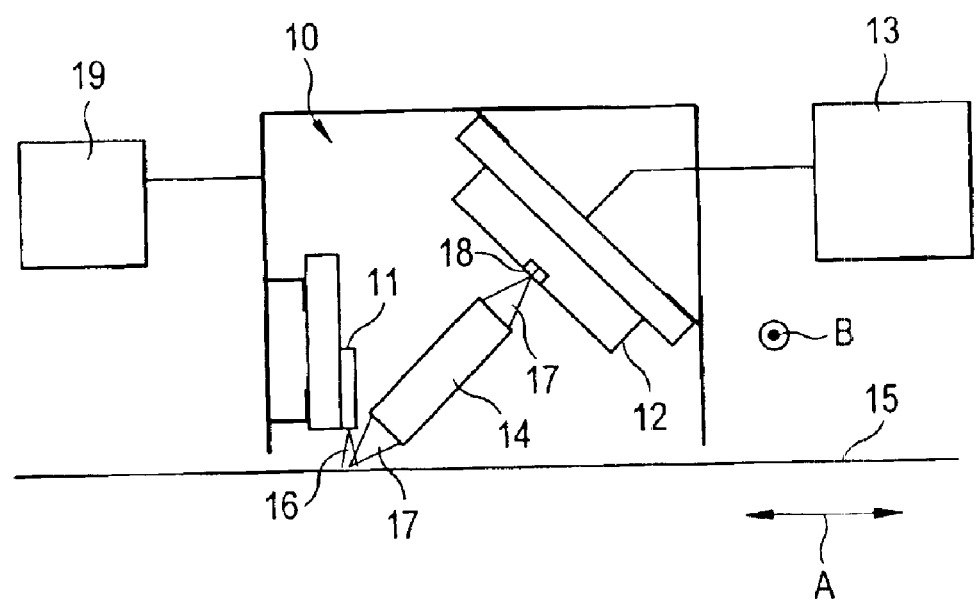
FIG. 2 shows an example of a reader head for reading the information stored in the memory phosphor.

FIG. 2 illustrates the reading head 10 in a sectional view transverse to the row direction B. A radiation source 11 is arranged inside the reading head 10 to perform the function of stimulating a row of the phosphor carrier plate 15. The radiation source 11 in the illustrated arrangement consists of a row of laser diodes. The row of laser diodes 11 is directed at the phosphor carrier plate in such a way that the radiation emitted by the individual laser diodes falls directly on the phosphor carrier plate 15. An optical element may be interposed between the laser diode row 11 and the phosphor carrier plate 15 for the purpose of focusing the stimulant radiation emitted by the laser diode row 11. FIG. 2 further shows a detecting device 12 which receives the secondary radiation emitted by the phosphor carrier plate 15 during an integration time period. In the example of FIG. 2, the detecting device 12 is configured as a row of CCDs. The linear CCD array 12 contains a large number of photo-detectors with photo-sensitive surfaces 18 that are arranged parallel and next to each other in a straight line. The CCD-row 12 performs a photoelectric transformation of the light radiation received from the phosphor carrier plate. An image-projecting element 14 is arranged between the phosphor carrier plate 15 and the CCD-array 12. The image-projecting element 14 serves to project an image of the radiation emitted by the stimulated pixel row of the phosphor carrier plate onto the photo-sensitive surfaces 18 of the CCD-array 12. The image-projecting element 14 may for example be composed of a large number of micro-lenses arranged next to each other in a straight line. The stimulant radiation which is emitted by the laser diode row 11 when the apparatus is in operation is identified in FIG. 2 by the reference symbol 16. The secondary radiation emitted by the phosphor carrier plate 15 in response to the stimulant radiation 16 is identified in FIG. 2 by the reference symbol 17.

The output of the CCD-array 12 is connected to the controller device 13. Among other tasks, the controller device 13 performs the functions of evaluating and processing the electrical signals generated by the CCD-array 12 which contain an image of the graphic information stored in the phosphor carrier plate 15. In addition, the controller device 13 controls the movement of the reading head 10 across the phosphor carrier plate 15. The reading head is advanced by a drive mechanism 19, for example a linear motor, which moves the reading head 10 at a uniform speed across the phosphor carrier plate 15. This arrangement allows the phosphor carrier plate 15 to be read line by line. The reading head 10 can be supported for example on sliding bearings that are arranged along the two longer borders of the phosphor carrier plate 15.

Figure 3:
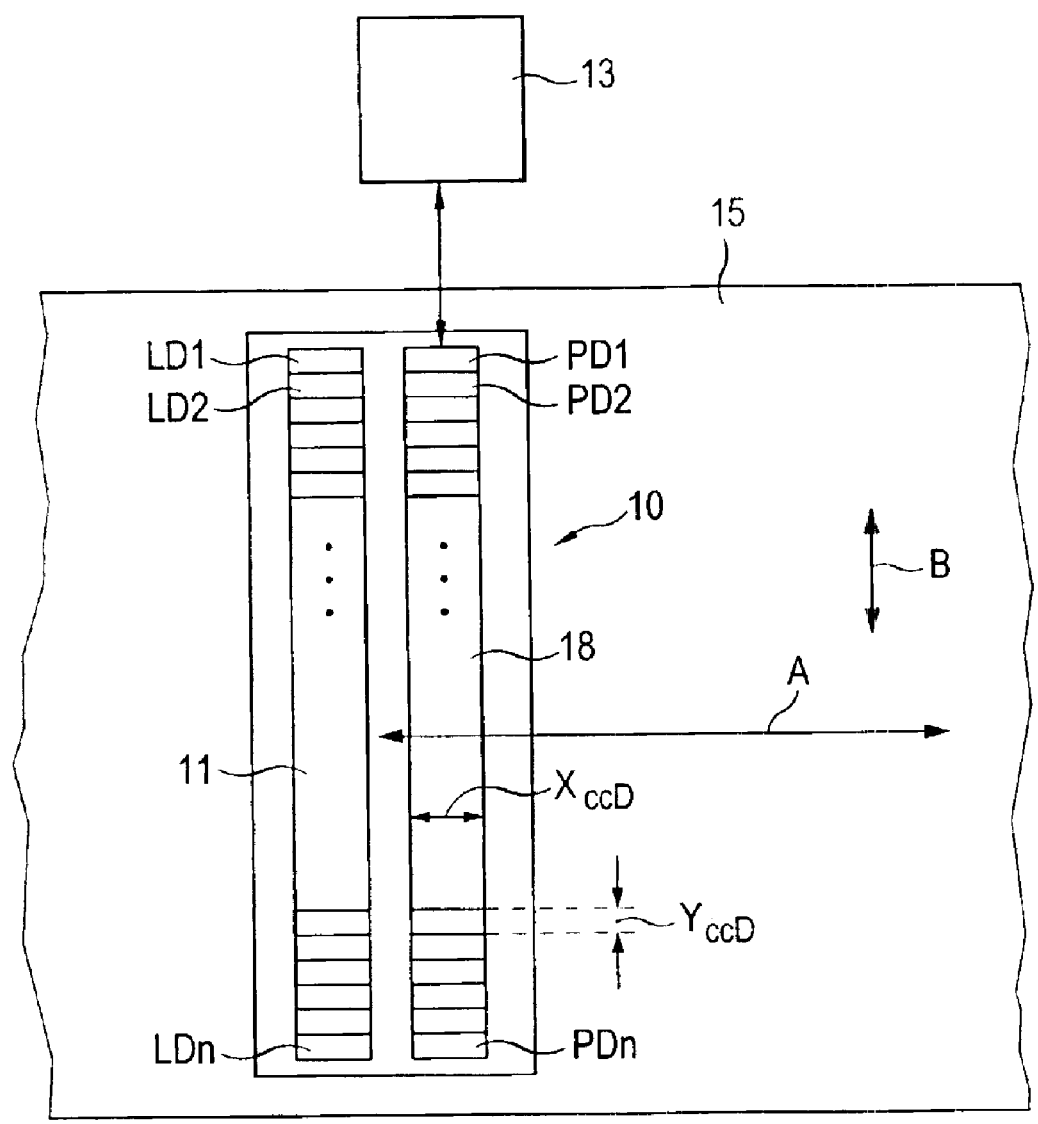
FIG. 3 represents the reader head of FIG. 2 with an elongated shape of the radiation-sensitive surface segments of the detecting device.

FIG. 3 represents a different view of the same embodiment of a reading head 10 as shown in FIG. 2. The reading head 10 and the phosphor carrier plate 15 in FIG. 3 are seen from above, with the reading head shown in a sectional plane through the laser diode row 11 and the CCD-array 12, parallel to the phosphor carrier plate 15 and the travel direction A of the reading head 10. FIG. 3 shows a large number of laser diodes LD1 to LDn that are arranged next to each other in a row. By means of the laser diodes LD1 to LDn, a strip across the entire width of the rectangular phosphor carrier plate 15 where information may be recorded can be stimulated to emit secondary radiation. By means of suitable optical elements, the beams of radiation emitted by the individual laser diodes can be spread so that they will at least partially overlap. In this way, the entire length of a row of pixels can be stimulated with a small number of laser diodes.

FIG. 3 shows the photo-sensitive surface segments 18 of the CCD-array 12 (FIG. 2). The CCD-array contains a row of photo detectors PD1 to PDn. Each photo detector PD1 to PDn has a photo-sensitive surface segment. In the embodiment of FIG. 3, the photo-sensitive surface segments 18 of the photo detectors PD1 to PDn are of an elongated shape, in this case rectangular. As another example, they could also be shaped elliptically. The dimensions of the photo-sensitive surface 18 of each of the photo detectors PD1 to PDn are $Y_{CCD}$ in the row direction B and $X_{CCD}$ in the travel direction A of the reading head, i.e., transverse to the row direction B. As shown, $Y_{CCD}$ is smaller than $X_{CCD}$. It is advantageous if the dimension of an individual surface segment 18 transverse to the row direction B is about two to eight times as large as the dimension in the row direction B. The dimension $Y_{CCD}$ in the illustrated case is about 50 $\mu$m, and the dimension $X_{CCD}$ is about 400 $\mu$m. The choice of 400 $\mu$m for the dimension $X_{CCD}$ has proved to be particularly advantageous for achieving a very good yield of usable information in relation to CCD noise.

The x-ray irradiation of the phosphor carrier plate 15 resulted in the creation of memory locations where the retrievable information is stored within the memory phosphor. Due to the stimulation by the laser-diode row 11, a large number of mutually adjacent scatter circles are produced on the phosphor carrier plate 15, with radiation being emitted out of the scatter circles from the surface of the phosphor carrier plate 15. Each scatter circle is dependent on the specific properties of the phosphor carrier plate, in particular the grain size, the memory phosphor particles, or the layer thickness of the memory phosphor used for the phosphor carrier plate 15. The scatter circles occur because the stimulant radiation emitted by the light-emitting diode array 11 is scattered within the phosphor carrier plate 15 dependent on the specific properties of the memory phosphor being used. The radiation emitted by the stimulated memory locations in response to the stimulant radiation is likewise being scattered as it propagates from the memory location to the exterior surface of the phosphor carrier plate 15. Due to these scattering effects, a loss of image sharpness occurs in the reading-out of the information stored in the phosphor carrier plate 15. This loss of sharpness is specific to the kind of memory phosphor being used. The loss of sharpness is due to the fact that the information stored at a given point of the phosphor carrier plate 15 does not exit from the plate surface at an exactly defined place above the point of storage. Instead, the information associated with a given point of the phosphor carrier plate 15 exits from the plate surface somewhere within the scatter circle that is associated with that storage point. In the arrangement according to the invention where an entire row of the phosphor carrier plate 15 is stimulated simultaneously, the scatter circles will partially overlap each other. As a result of this loss of sharpness in the phosphor carrier plate 15, there can be no perfectly sharp transition between a large amount of secondary radiation emitted by one pixel and a small amount of secondary radiation emitted by a neighboring pixel, or vice versa. This phenomenon can be used according to the invention to make at least a partial prediction of the amounts of secondary radiation to be anticipated in the scanning of subsequent rows of the phosphor carrier plate 15.

Figure 4:
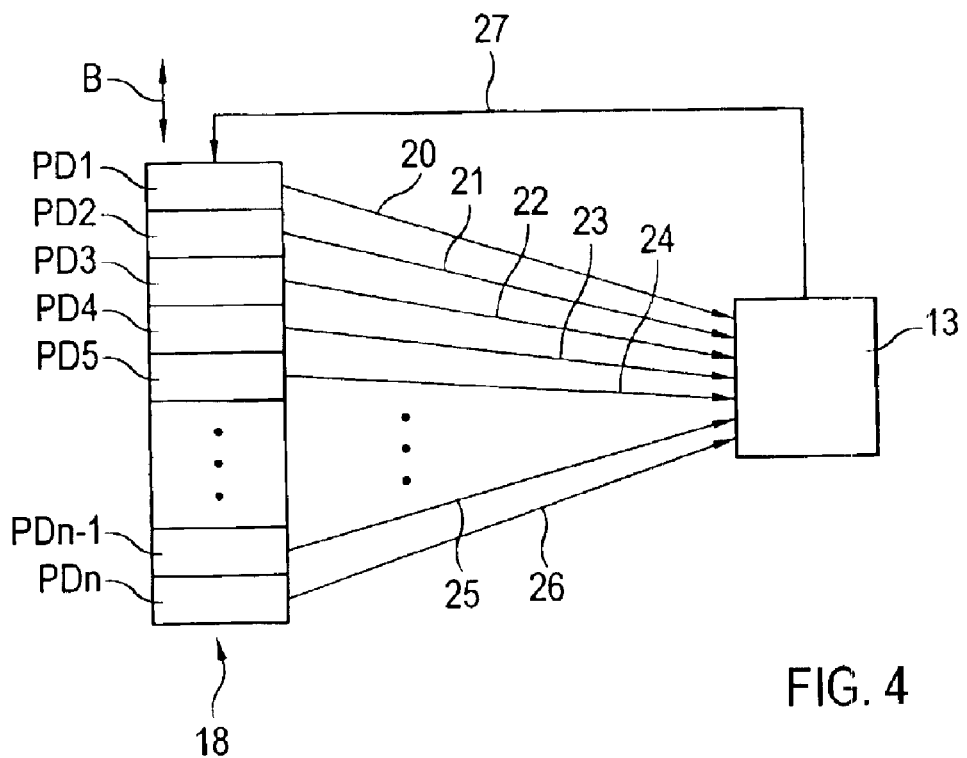
FIG. 4 schematically represents an example of a transmission of electrical signals from individual radiation-sensitive surface segments to the controller device.

FIG. 4 schematically illustrates the transmission of electrical signals 20 to 26 from the photo-detectors PD1 to PDn (which are also shown in FIG. 3) to the controller device 13. The controller device 13 is connected to the photo-detectors PD1 to PDn through an electrical connecting line 27. The connecting line 27 allows the controller device 13 to communicate with the individual photo-detectors. The controller device may, e.g., consist of an appropriately programmed digital signal processor. The controller device 13 serves to set the integration time interval during which the photo-detectors PD1 to PDn can detect the secondary radiation. The setting of the integration time may for example be communicated from the controller device 13 through the electrical connecting line 27 to the photo-detectors. In the embodiment of FIG. 4, each of the photo-detectors PD1 to PDn transmits its own electrical signal to the controller device 13. As an example, FIG. 4 shows the electrical signals 20 to 26. The first photo-detector PD1 transmits the first electrical signal 20, the second photo-detector PD2 transmits the second electrical signal 21, and so on, up to the last photo-detector PDn transmitting the signal 26 to the controller device 13. The electrical signals 20 to 26 indicate the amounts of secondary radiation that was emitted by the phosphor carrier plate 15 in response to the stimulant radiation of the laser diodes and received by the individual photo-detectors PD1 to PDn during the set integration time period. The controller device 13 evaluates the information contained in the electrical signals and, based on given criteria, sets the integration time period during which the secondary radiation is to be received by the photo-detectors PD1 to PDn in the continuation of the scanning process. As an advantageous concept, each time an individual row of the phosphor carrier plate 15 has been scanned by the reading head, the integration time period can be determined for a subsequent row that remains yet to be scanned. The subsequent row does not have to be the immediately following row. It can also be advantageous to make a prediction about the amount of secondary radiation to be anticipated for the second or third following row. In the embodiment of FIG. 4, the photo-detectors are not connected into groups, i.e. the number N of connected photo-detectors equals 1.

Even in a case as shown in FIG. 4, where the photodetectors are not combined into groups or where a short integration time interval has been set, it is possible to gain an advantage by using the controller device to mathematically add the amounts of secondary radiation that were received and transmitted by the photo-detectors PD1 to PDn during the set integration time and signaled to the controller device. For example, the signals can be mathematically added for groups of three photo-detectors, i.e., 20, 21, 22, followed by 23, 24, 25, etc. In the mathematical addition of the signals, the usable portions as well as the noise portions of the signals are additive. However, because of the random nature of the noise, the noise portions of the signals add up as the root of the sum of squares, so that the combined noise is only √3 times as large as the noise of an individual signal, while the usable signal portions are subject to a linear addition, so that the signal-to-noise ratio will be improved by the mathematical addition of the signals.

Figure 5:
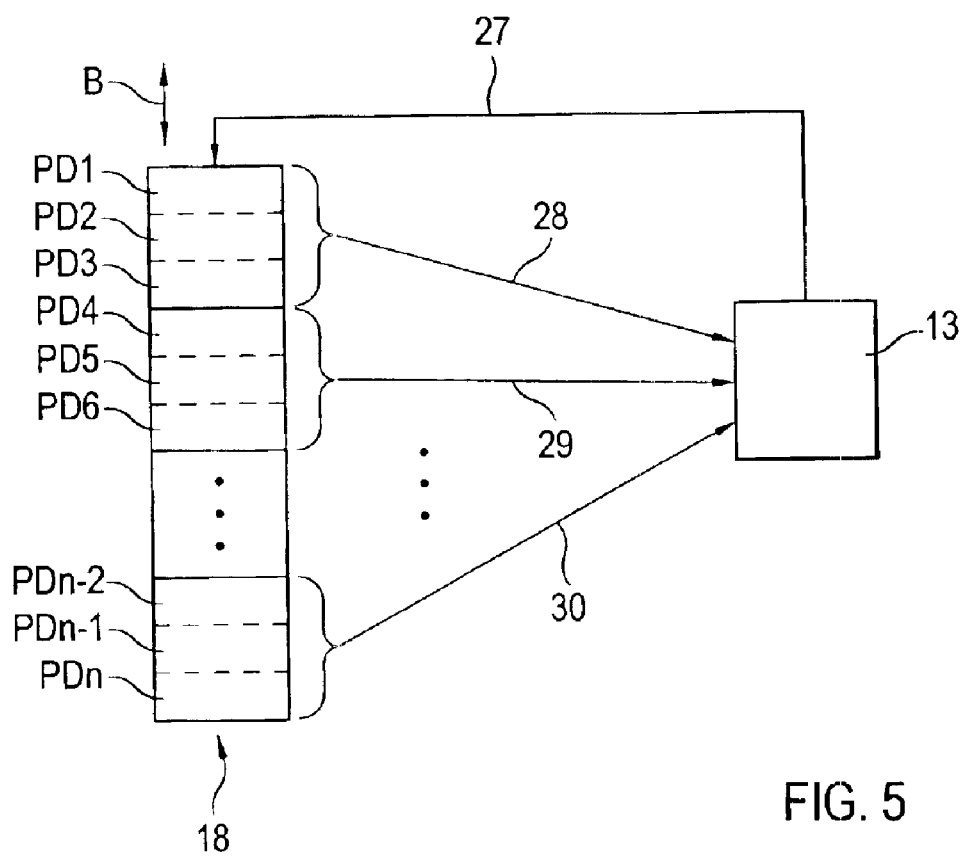
FIG. 5 schematically represents a further example of a transmission of electrical signals, where the radiation-sensitive surface segments of the detecting device are combined into groups.

FIG. 5 schematically illustrates another arrangement for the transmission of electrical signals from the photodetectors PD1 to PDn to the controller device 13. The photodetectors in this example have been combined into groups of three through appropriate command signals from the controller device 13 to the individual photo-detectors PD1 to PDn by way of the connecting line 27. In the illustrated example, the photo-detectors are combined into the groups PD1 to PD3, PD4 to PD5, . . . up to PD(n−2) to PDn. The groups of photo-detectors collect secondary radiation emitted by the phosphor carrier plate 15 over an integration time period. The amount of radiation received by each of the triads of photo-detectors is transmitted to the controller device 13 by means of an electrical signal. In the illustrated case, the photodetectors PD1 to PD3 transmit the electrical signal 28, the photo-detectors PD4 to PD6 transmit the electrical signal 29, and the photo-detectors PD(n−2) to PDn transmit the electrical signal 30 to the controller device 13. By combining three photo-detectors into a group, the resultant combined (effective) pixel length from which the three photo-detectors together collect secondary radiation is tripled in the row direction B. Thus, if the individual photo-detectors each measure 50 μm in the row direction B, a group of three combined photo-detectors covers a 150 μm-segment of a row. The effective pixel length in the travel direction A of the reading head depends on the speed at which the reading head advances over the phosphor carrier plate 15 and on the selected integration time. Combining the photo-detectors into groups of three improves the separation between the usable signal portion and the noise of the electrical signals 28 to 30 in comparison to the signal-to-noise separation of the signals 20 to 26 (FIG. 4). In the arrangement of FIG. 5 where the output from each group of three photo-detectors is read as one combined signal, the noise portion of the reading signal which is caused in particular by the noise of the amplifier of the CCD module remains the same as the noise portion from a single, non-combined photo-detector. At the same time, the usable signal portions of the three photo-detectors in each group are additively combined. Thus, the signal-to-noise ratio is increased in comparison to the non-combined operating mode of the photo-detectors. In particular, the combined mode offers a sensible solution if the amount of the secondary radiation received by each photo-detector is low, i.e., if the usable signal is weak. With the low volume of the detected secondary radiation, it is unlikely that using the photo-detectors in groups of three will drive the detecting device to the saturation level. This would be the case if the amount of secondary radiation detected by the triplets of photo-sensors were larger than the maximum volume of secondary radiation that the detecting device is capable of detecting in one scanning cycle. The limitation on the maximally detectable volume of radiation is determined in particular by the size of the output register of the detecting device (CCD).

Figure 6:
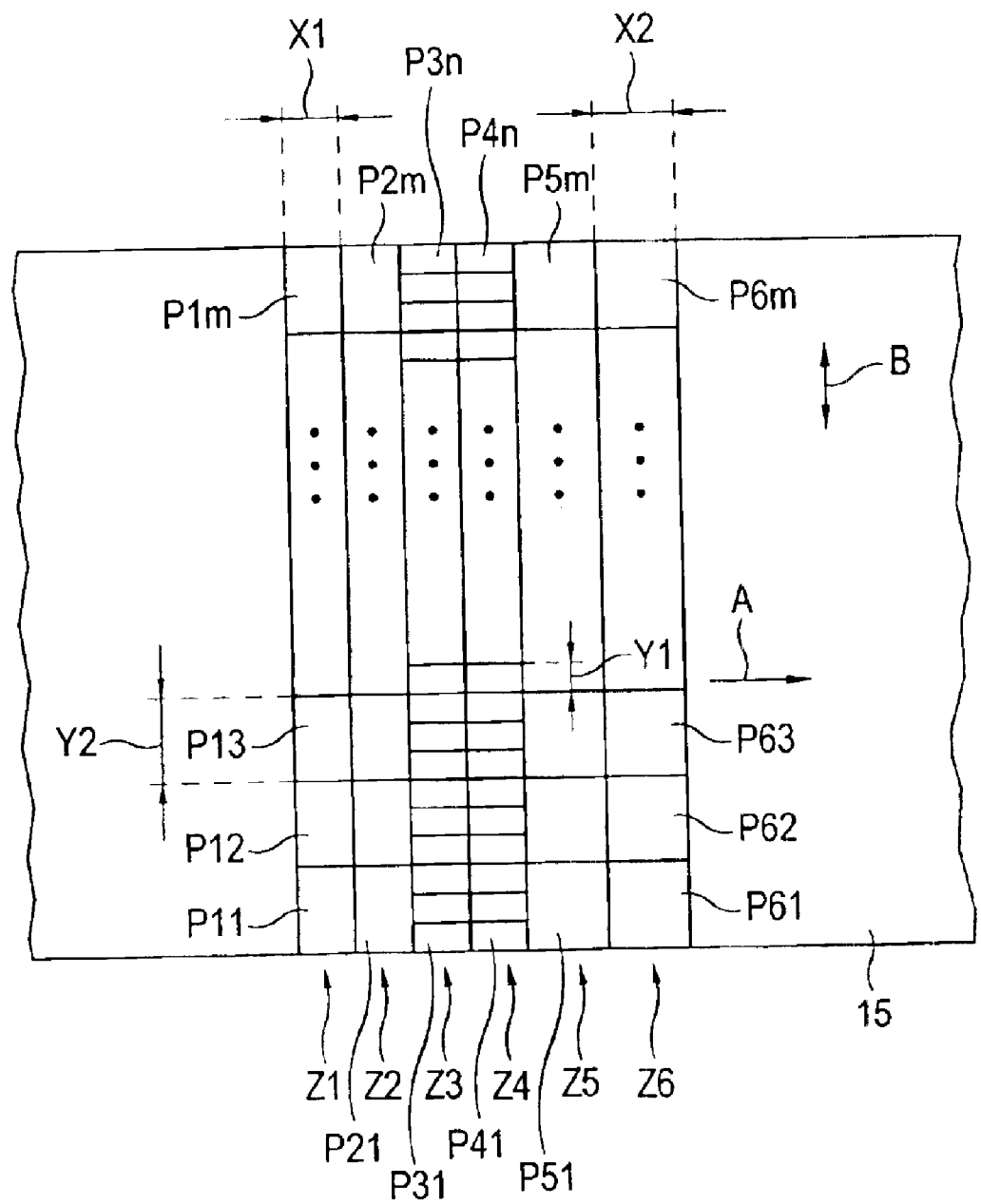
FIG. 6 schematically represents different rows that have been read from a phosphor carrier plate holding the memory phosphor.

FIG. 6 shows a schematic representation of a part of the phosphor carrier plate 15, in which six rows Z1 to Z6 were scanned by the reading head 13. The dimension of the rows Z1 to Z6 in the travel direction A is determined by the integration time interval that is in effect for the scanning of the rows Z1 to Z6 and the travel speed at which the reading head 10 advances across the phosphor carrier plate 15. In the illustrated example of FIG. 6, the rows Z1 to Z4 have a dimension X1 in the travel direction A. As the travel speed of the reading head 10 remains substantially constant during the entire scanning process of the phosphor carrier plate 15, an integration time interval T1 has been set by the controller device 13 for the scanning of the rows Z1 to Z4. The rows Z5 and Z6 have a dimension X2 in the travel direction A of the reading head 10. The dimension X2 is larger than X1, which results from the fact that at a constant travel speed of the reading head 10, the integration time interval T2 for scanning the rows Z5 and Z6 was longer than the integration time interval for the scanning of the rows Z1 to Z4. Thus, the effective pixel dimension in the travel direction is larger for the rows Z5 and Z6 than for the rows Z1 to Z4.

Counting pixels along the row direction B, each of the rows Z1 to Z6 has a certain number of pixels. Each of the rows Z1, Z2, Z5, and Z6 has the same number m of pixels. The row Z1 contains the pixels P11 to P1m, the row Z2 contains the pixels P21 to P2m, the row Z5 contains the pixels P51 to P5m, and the row Z6 contains the pixels P61 to P6m. The pixels of the rows Z1, Z2, Z5 and Z6 have the dimension Y2 in the row direction B. The rows Z3 and Z4 contain n pixels per row. The row Z3 contains the pixels P31 to P3n, and the row Z4 contains the pixels P41 to P4n. In the row direction B, the pixels of the rows Z3 and Z4 have a dimension Y1 that is smaller than Y2. The effective pixel width Y1 of the pixels in rows Z3 and Z4 is substantially equal to the dimension $Y_{CCD}$ of the photo-detectors PD1 to PDn of the reading head 10. For the scanning of the rows Z3 and Z4, the individual photo-detectors were not connected into groups. Each of the photo-detectors transmitted its own signal to the controller device 13 to indicate the quantity of secondary radiation received. Since the photodetectors PD1 to PDn where not connected into groups for the scanning of the rows Z3 and Z4, the number n of the pixels in rows Z3 and Z4 is equal to the number of photo-detectors.

In the case of the rows Z1, Z2, Z5 and Z6 the pixel dimension Y2 in the row direction B is larger than the dimension Y1 for the rows Z3 and Z4. For the scanning of the rows Z1, Z2, Z5 and Z6, the photo detectors where connected in groups of three, as illustrated already in FIG. 5. Thus, the effective pixel width Y2 in the row direction B is approximately three times as large as the dimension Y2 of the pixels in rows Z3 and Z4. Since the photo-detectors where connected in groups of three for the scanning of the rows Z1, Z2, Z5, and Z6, the number of pixels m in these rows is only one-third of the number n of the pixels in rows Z3 and Z4.

The setting of the integration time intervals P1 and P2 as well as the step of connecting the photo-detectors into groups for the scanning of the rows of the phosphor carrier plate 15 is based on the preceding scans of one or more rows of the phosphor carrier plate 15. For example, the setting of the integration time interval T1 and switching of the photo-detectors to the non-combined mode for the scanning of the row Z3 can be selected by the controller device on the basis of the amount of secondary radiation emitted from rows Z1 and/or Z2 and received by the photo-detectors. For example, based on the evaluation of the amount of secondary radiation emitted by the pixels in rows Z1 and/or Z2 and received by the photo-detectors in the process of scanning rows Z1 and Z2, the controller device found that a higher amount of secondary radiation is to be anticipated in the scan of row Z3. To avoid driving the detecting device 12 into saturation, the controller device canceled the connected operating mode of the photo-detectors that was in effect for the scan of row Z3.

However, for the scan of row Z5, the photo-detectors were again switched to operate in the combined mode. In addition, the integration time interval was made longer than for the scan of rows Z1 to Z4. This may for example have the reason that from the scan of row Z3 and/or Z4 is was possible to predict on the basis of the detected amount of secondary radiation that a significantly smaller amount of secondary radiation was to be expected in the scan of row Z5. The setting of the integration time interval and the determination whether and in what numbers the photo-detectors should be combined into groups can be made on the basis of different criteria. The selection of the criteria may depend on the specific application. In particular, the criterion may take either only one or more than one of the immediately preceding row scans into account. Furthermore, the controller device may evaluate only one, or more than one, in particular all of the pixels of the immediately preceding row scans. Another suitable criterion for the setting of the integration time and/or the switching of the photo-detectors to a connected mode is based on differences in the amounts of secondary radiation between adjacent pixels of one or more rows.

Figure 7:
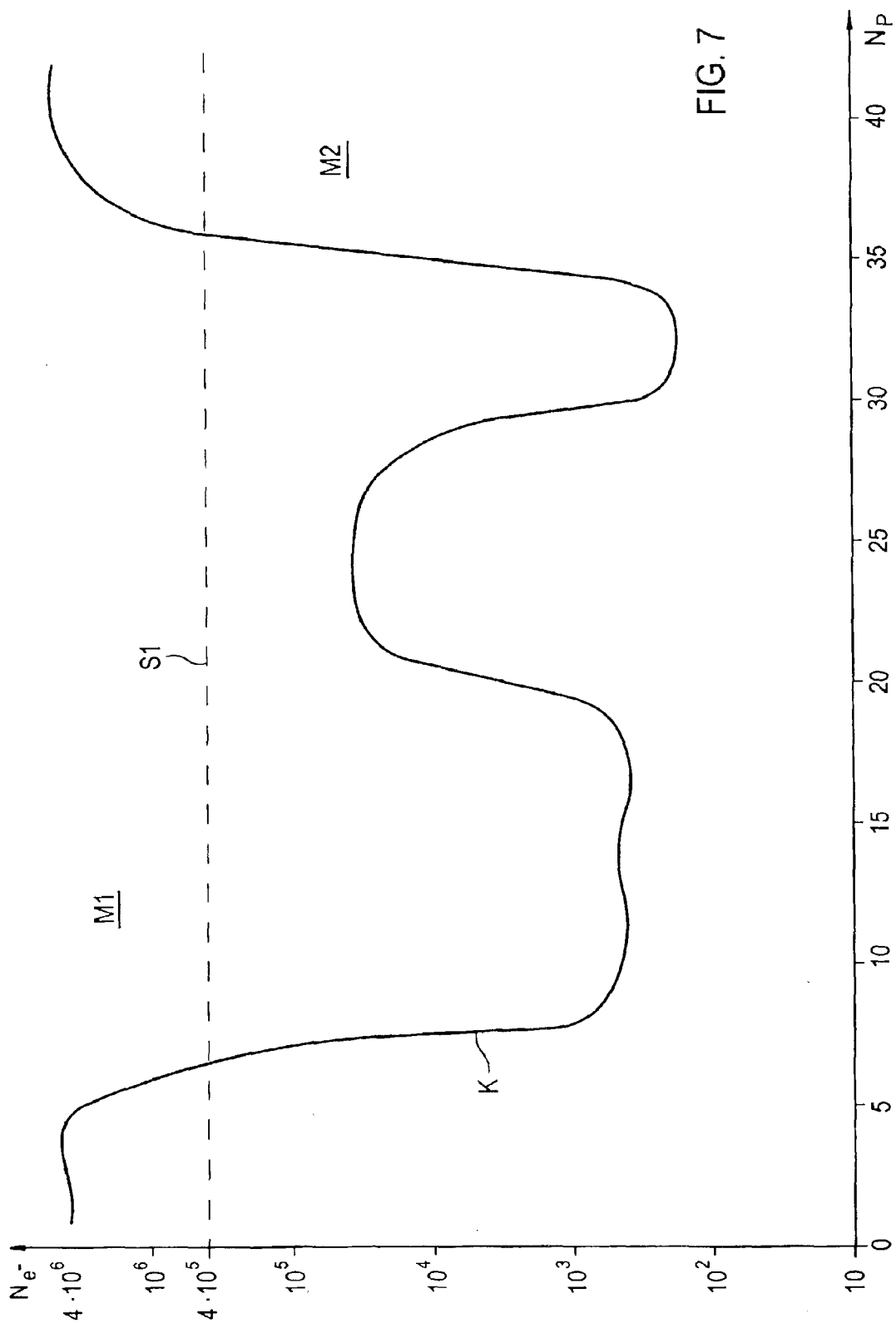
FIG. 7 represents a first example of a series of measurements using one threshold value in the detection of emitted radiation released from mutually adjacent pixels of several mutually adjacent rows of the phosphor carrier plate holding the memory phosphor.

FIG. 7 represents a series of measurements K as an example to further illustrate how the inventive apparatus works. The variable $N_P$ on the abscissa indicates the numbers of successive rows on the phosphor carrier plate 15. The variable $N_e-$ on the ordinate represents the number of electrons generated by a specific individual photo-detector of the detecting device 12 as the reading head moves from row to row. The number of electrons is plotted on a logarithmic scale. For example, based on the amount of secondary radiation from the pixel in row $N_P=1$ at the position opposite the specifically selected individual photo-detector element, the graph of FIG. 7 indicates that approximately $4 \times 10^6$ electrons were generated. The same number of electrons were generated also by the pixel at the same position in row $N_P=2$, and a slightly higher number by the pixel in row $N_P=3$. For the pixel at the same location in the row $N_P=7$, the number of electrons is only about $8 \times 10^4$, and much lower in the subsequent rows, i.e., only about $8 \times 10^2$ in the row $N_P=8$, and so forth up to row $N_P=41$, which is the last row shown in FIG. 7. Also indicated in FIG. 7 is a first threshold value S1 at a number of electrons of $4 \times 10^5$. This first threshold value serves as a criterion for the controller device 13 to switch between a first (short) integration time interval and a second (long) integration time interval. In a first operating mode M1, represented in FIG. 7 by the range above the first threshold value S1, the first, i.e., short, integration time interval is selected. The mode M1 is used if the number of electrons generated by the detecting device 12 is predicted to be above the first threshold value. In the second mode, which is represented by the range below the first threshold value, the second, i.e., longer integration time interval is selected by the controller device, because the number of electrons generated by the detecting device 12 is predicted to be below the first threshold value S1.

Thus, if the pixel at a specific position within the row is used as a criterion for setting the integration time interval, since the scanning result from the pixel in row $N_P=6$ in the graph of FIG. 7 lies above the threshold value S1, the first (short) integration time interval will be selected for the subsequent scanning of the row $N_P=7$. However, the scan of row $N_P=7$ shows that the electron count for the pixel at the test location is below the threshold S1. The controller device will therefore set the second, i.e., longer, integration time interval for the subsequent scan of the $N_P=8$. The second integration time interval remains in effect for all of the scans up to the row $N_P=36$. The scan result of the row $N_P=36$ once more indicates a number of electrons $N_e-$ above the threshold value S1. Accordingly, the controller device switches to the first (short) integration time for the scan of the row $N_P=37$.

The example of FIG. 7 illustrates how the integration time interval is set based on a threshold value S1. The procedure according to the foregoing description can be uses analogously for switching the group-connection mode of the photo-detectors. In the mode M1, the photo-detectors are either not connected at all or connected in groups of only a small number $N_2$ of photo-detectors. In the mode M2, on the other hand, a larger number $N_1$ of photo-detectors are combined in a group.

Instead of using the absolute number of electrons generated, it is possible to use a more exact procedure for setting the integration time interval or for selecting a connected mode for the scanning of one or more of the subsequent rows. This can be achieved, e.g., with the alternative or additional step of evaluating the differences between the numbers of electrons generated by the radiation from pixels in two adjacent rows. For example, in the graph K of FIG. 7, there is a relatively large difference between the numbers of electrons generated from the reading of the adjacent pixels in rows 5 and 6. The number of electrons in row 6 shows a strong decrease in comparison to row 5. The controller device can be programmed to assume that a further drop in the number of electrons could occur in the reading of the adjacent pixel in row 7. Based on this prediction, the longer (second) integration time interval or the switch to a connected mode of the photo-detectors can be made already for the scan of row 7. As this example shows, it can be advantageous to also evaluate the gradient of the number of electrons generated in the reading of pixels in consecutive rows.

An analogous observation can be made in regard to row 36. The reading of the pixel in row 35 generates a significantly higher number of electrons than the reading of the adjacent pixel in row 34. The change in the number of generated electrons can be monitored, e.g., by means of a further threshold value. Based on the large differential in the number of electrons generated in row 35 compared to row 34, one could predict that the threshold value S1 will be exceeded in the reading of row 36. Therefore, the shorter (first) integration time interval is selected already for the scanning of row 36. In addition or as an alternative, if the photo-detectors were previously set to work in a connected mode, the connected mode can be canceled for the reading of row 36.

Figure 8:
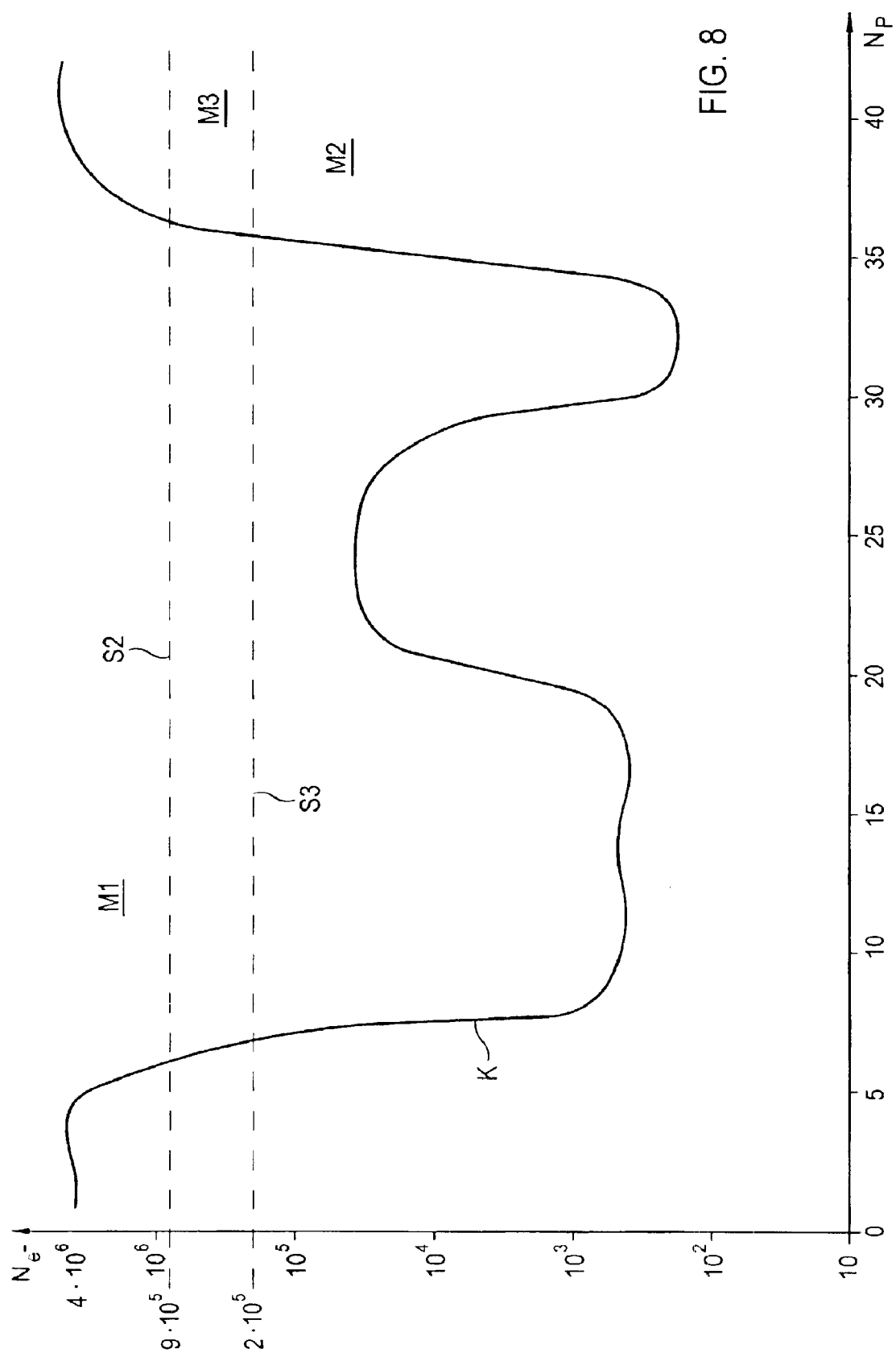
FIG. 8 represents a second example of a series of measurements using two threshold values in the detection of emitted radiation released from mutually adjacent pixels of several mutually adjacent rows of the phosphor carrier plate holding the memory phosphor.

FIG. 8 represents the same series of measurements K in the context of a second example where two threshold values S2 and S3 are used instead of the single threshold value S1 of FIG. 7. The upper threshold value S2 is set at an approximate number of $9 \times 10^5$ electrons, while the lower threshold value S3 is set at an approximate number of $2 \times 10^5$ electrons. The range above the threshold value S2 corresponds to the mode M1, while the range below the threshold value S3 corresponds to the mode M2. The range between the threshold values S2 and S3 corresponds to a third mode M3. The concept of using two threshold values allows a hysteresis-like behavior to be programmed into the switching between integration time intervals or between the connected and non-connected modes of the photo-detectors. In the mode M3, the controller device 13 can select either of the modes M1 and M2 depending on which of the modes was previously in effect. More specifically, if the electron count falls from a number above S2 to a number below S2, the detecting device will not immediately switch from mode M1 (short integration time interval and/or non-connected mode of photo-detectors) to mode M2 (long integration time interval and/or connected mode of photo-detectors). The switch does not occur unless and until the electron count from the reading of a pixel in a row drops below the threshold S3. This condition is met by the electron count obtained in the reading of the pixel in row 7.

The switching of the detecting device from the mode M2 into the mode M1 occurs in an analogous manner. If the detecting device 12 is operating in mode M2, it will not immediately switch to mode M1 when the electron count has risen above the threshold value S3. This condition exists, e.g., for the pixel of row 36 in the graph K of FIG. 8. The threshold S3 has already been exceeded at this point, but the electron count still falls short of the threshold S2. The detecting device continues to operate in mode M2 until the threshold S2 is exceeded in the scan of line 37, whereupon the detecting device is switched to the mode M1 prior to the scan of row 38. The concept of using two threshold values according to the example of FIG. 8 can also be practiced by evaluating the difference in electron counts between pixels in consecutive rows, analogous to the procedure that was discussed above in the context of FIG. 7.

It is possible for the controller device to mark the points at which the detecting device switches from one mode to the other. This can be accomplished, e.g., by setting a specific flag in the program flow of the controller device 13. Thus, when the information is processed in the controller device subsequent to the scanning, the mode changes can be indicated. The flag can be used to edit the information gained from the image scan, e.g., to take into account the change in resolution that occurs as a result of switching from one mode to the other.

What is claimed is:

1. An apparatus for reading information stored in a memory phosphor, said apparatus comprising a detecting device for detecting a secondary radiation emitted by the memory phosphor; wherein the detecting device comprises a plurality of radiation-sensitive surface segments operable to receive the secondary radiation during a pre-settable integration time interval; said apparatus further comprising a controller device operable to set the integration time interval dependent on a detected amount of said secondary radiation received by at least one of the radiation-sensitive surface segments at a preceding time.

2. The apparatus of claim 1, wherein the controller device comprises a first threshold value corresponding to a given first amount of the secondary radiation; wherein the controller device is operable to set a first integration time interval if said detected amount of said secondary radiation is larger than the first threshold value, and to set a second integration time interval if said detected amount of said secondary radiation is smaller than the first threshold value; the first integration time interval being shorter than the second integration time interval.

3. The apparatus of claim 1, wherein the controller device comprises a first threshold value corresponding to a given first amount of the secondary radiation and a second threshold value corresponding to a given second amount of the secondary radiation, said second amount being smaller than said first amount; wherein the controller device is operable to set a first integration time interval if said detected amount of said secondary radiation is larger than the first threshold value, to set a second integration time interval if said detected amount of said secondary radiation is smaller than the second threshold value, and to keep an existing integration time interval in effect if said detected amount of said secondary radiation is smaller than the first threshold value but larger than the second threshold value; the first integration time interval being shorter than the second integration time interval.

4. The apparatus of claim 1, wherein the plurality of radiation-sensitive surface segments comprises a linear array and wherein an entire row of the information stored in the memory phosphor is read at one time.

5. The apparatus of claim 4, wherein the controller device performs the setting of the integration time interval for one row at a time.

6. The apparatus of claim 4, wherein the detected amount of the secondary radiation comprises an amount of the secondary radiation received by one of the radiation-sensitive surface segments in the reading of one of the rows.

7. The apparatus of claim 4, wherein the detected amount of the secondary radiation comprises an amount of the secondary radiation received by more than one of the radiation-sensitive surface segments in the reading of one of the rows.

8. The apparatus of claim 7, wherein the controller device is operable to evaluate a difference between amounts of secondary radiation received by at least two mutually adjacent radiation-sensitive surface segments in the reading of one of the rows.

9. The apparatus of claim 4, wherein the detected amount of the secondary radiation comprises an amount of the secondary radiation received by at least one of the radiation-sensitive surface segments in the reading of a sequence of more than one of the rows.

10. The apparatus of claim 9, wherein the controller device is operable to evaluate a difference between a first amount of secondary radiation and a second amount of secondary radiation, said first amount having been received by the at least one of the surface segments in the reading of a first row and said second amount having been received by the at least one of the surface segments in the reading of a second row.

11. The apparatus of claim 1, further comprising a drive mechanism operable to move the detecting device in relation to the memory phosphor and to thereby generate a movement in an advancing direction for the reading of the stored information from the memory phosphor.

12. The apparatus of claim 11, wherein the drive mechanism is configured so that the drive mechanism transports the detecting device across the memory phosphor.

13. The apparatus of claim 1, wherein the plurality of radiation-sensitive surface segments extends as a linear array in a row direction, the detecting device is movable relative to the memory phosphor in an advancing direction, the radiation-sensitive surface segments have a first dimension $Y_{CCD}$ in said row direction and a second dimension $X_{CCD}$ in said advancing direction, and wherein said first and second dimensions are different from each other.

14. The apparatus of claim 13, wherein the first dimension $Y_{CCD}$ is smaller than the second dimension $X_{CCD}$.

15. The apparatus of claim 1, wherein the information stored in the memory phosphor comprises an image produced by x-rays.

16. The apparatus of claim 1, wherein the detection device is operable to detect the secondary radiation emitted by the memory phosphor immediately after the information has been stored.

17. The apparatus of claim 2, wherein the controller device is configured so that the first integration time interval is set as an initial setting before the reading of the information from the memory phosphor is started.

18. An apparatus for reading information stored in a memory phosphor, said apparatus comprising a detecting device for detecting a secondary radiation emitted by the memory phosphor; wherein the detecting device comprises a plurality of radiation-sensitive surface segments operable to receive the secondary radiation and wherein the detecting device is operable to generate electrical signals indicative of amounts of said secondary radiation received by the surface segments; said apparatus further comprising a controller device operable to connect the radiation-sensitive surface segments into one or more groups dependent on a detected amount of said secondary radiation received by at least one of the radiation-sensitive surface segments at a preceding time, so that the detecting device generates a combined signal for the surface elements of each group, said combined signal being indicative of a combined amount of said secondary radiation received by a group of surface segments.

19. The apparatus of claim 18, wherein the controller device comprises a first threshold value corresponding to a given first amount of the secondary radiation; wherein the controller device is operable to connect the radiation-sensitive surface segments into one or more groups of $N_1$ surface segments, if said detected amount of said secondary radiation is smaller than the first threshold value, $N_1$ being an integer number larger than 1.

20. The apparatus of claim 19, wherein the controller device is operable to connect the radiation-sensitive surface segments into one or more groups of $N_2$ surface segments, if said detected amount of said secondary radiation is larger than the first threshold value, $N_2$ being an integer number equal to or larger than 1 but smaller than $N_1$.

21. The apparatus of claim 18, wherein the controller device comprises a first threshold value corresponding to a given first amount of the secondary radiation and a second threshold value corresponding to a given second amount of the secondary radiation, said second amount being smaller than said first amount; wherein the controller device is operable to connect the radiation-sensitive surface segments into one or more groups of $N_1$ surface segments if said detected amount of said secondary radiation is smaller than the second threshold value, to connect the radiation-sensitive surface segments into groups of $N_2$ surface segments if said detected amount of said secondary radiation is larger than the first threshold value, and to keep an existing grouping of surface segments in effect if said detected amount of said secondary radiation is smaller than the first threshold value but larger than the second threshold value; $N_1$ and $N_2$ being integer numbers and $N_2$ being equal to or larger than 1 but smaller than $N_1$.

22. The apparatus of claim 18, wherein the plurality of radiation-sensitive surface segments comprises a linear array and wherein an entire row of the information stored in the memory phosphor is read at one time.

23. The apparatus of claim 22, wherein the controller device performs the connecting of the radiation-sensitive surface segments for one row at a time.

24. The apparatus of claim 22, wherein the detected amount of the secondary radiation comprises an amount of the secondary radiation received by one of the radiation-sensitive surface segments in the reading of one of the rows.

25. The apparatus of claim 22, wherein the detected amount of the secondary radiation comprises an amount of the secondary radiation received by more than one of the radiation-sensitive surface segments in the reading of one of the rows.

26. The apparatus of claim 25, wherein the controller device is operable to evaluate a difference between amounts of secondary radiation received by at least two mutually adjacent radiation-sensitive surface segments in the reading of one of the rows.

27. The apparatus of claim 22, wherein the detected amount of the secondary radiation comprises an amount of the secondary radiation received by at least one of the radiation-sensitive surface segments in the reading of a sequence of more than one of the rows.

28. The apparatus of claim 27, wherein the controller device is operable to evaluate a difference between a first amount of secondary radiation and a second amount of secondary radiation, said first amount having been received by the at least one of the surface segments in the reading of a first row and said second amount having been received by the at least one of the surface segments in the reading of a second row.

29. The apparatus of claim 18, further comprising a drive mechanism operable to move the detecting device in relation to the memory phosphor and to thereby generate a movement in an advancing direction for the reading of the stored information from the memory phosphor.

30. The apparatus of claim 29, wherein the drive mechanism is configured so that the drive mechanism transports the detecting device across the memory phosphor.

31. The apparatus of claim 18, wherein the plurality of radiation-sensitive surface segments extends as a linear array in a row direction, the detecting device is movable relative to the memory phosphor in an advancing direction, the radiation-sensitive surface segments have a first dimension $Y_{CCD}$ in said row direction and a second dimension $X_{CCD}$ in said advancing direction, and wherein said first and second dimensions are different from each other.

32. The apparatus of claim 31, wherein the first dimension $Y_{CCD}$ is smaller than the second dimension $X_{CCD}$.

33. The apparatus of claim 18, wherein the information stored in the memory phosphor comprises an image produced by x-rays.

34. The apparatus of claim 18, wherein the detection device is operable to detect the secondary radiation emitted by the memory phosphor immediately after the information has been stored.

35. The apparatus of claim 19, wherein the controller device is configured to connect the radiation-sensitive surface segments into groups of $N_1$ surface segments as an initial grouping before the reading of the information from the memory phosphor is started.

36. An apparatus for reading information stored in a memory phosphor, said apparatus comprising a detecting device for detecting a secondary radiation emitted by the memory phosphor; wherein the detecting device comprises an array of radiation-sensitive surface segments operable to receive the secondary radiation during a pre-settable integration time interval; said apparatus further comprising a controller device operable to set the integration time interval dependent on a detected amount of said secondary radiation received by at least one of the radiation-sensitive surface segments at a preceding time, and also operable to connect the radiation-sensitive surface segments into groups dependent on said detected amount of said secondary radiation.

37. A method of reading information stored in a memory phosphor, comprising the steps of:

a) by means of a plurality of radiation-sensitive surface segments, receiving a secondary radiation emitted by the memory phosphor during a currently effective integration time interval;

b) evaluating an amount of said secondary radiation received by at least one of the radiation-sensitive surface segments during the currently effective integration time interval;

c) based on said evaluation, maintaining the currently effective integration time interval for a next cycle of the method, or setting a new integration time interval for the next cycle of the method;

d) proceeding to the next cycle beginning with step a).

38. A method of reading information stored in a memory phosphor, wherein the memory phosphor emits a secondary radiation that is received by a plurality of radiation-sensitive surface segments of a detecting device, wherein the detecting device generates electrical signals indicative of amounts of said secondary radiation received by the surface segments, and wherein said surface segments can be connected into one or more groups of surface segments, the method comprising the steps of:

a) by means of the plurality of radiation-sensitive surface segments, receiving the secondary radiation emitted by the memory phosphor;

b) evaluating an amount of said secondary radiation received by at least one of the radiation-sensitive surface segments;

c) based on said evaluation, maintaining a currently effective grouping of surface segments for a next cycle of the method, or switching to a different grouping of surface segments for the next cycle of the method;

d) proceeding to the next cycle beginning with step a).

* * * * *